United States Patent
Kawabata et al.

(10) Patent No.: US 9,862,014 B2
(45) Date of Patent: Jan. 9, 2018

(54) METHOD FOR ELECTRIC RESISTANCE WELDED STEEL TUBE

(71) Applicant: JFE Steel Corporation, Tokyo (JP)

(72) Inventors: Yoshikazu Kawabata, Tokyo (JP); Masayuki Sakaguchi, Tokyo (JP); Kei Sakata, Tokyo (JP)

(73) Assignee: JFE Steel Corporation (JP)

( * ) Notice: Subject to any disclaimer, the term of this patent is extended or adjusted under 35 U.S.C. 154(b) by 1345 days.

(21) Appl. No.: 13/711,942

(22) Filed: Dec. 12, 2012

(65) Prior Publication Data

US 2013/0098899 A1    Apr. 25, 2013

Related U.S. Application Data

(62) Division of application No. 12/528,551, filed as application No. PCT/JP2008/051596 on Jan. 25, 2008, now abandoned.

(30) Foreign Application Priority Data

Feb. 26, 2007    (JP) .................. 2007-045749

(51) Int. Cl.
    B23K 11/00    (2006.01)
    B23K 13/01    (2006.01)
    (Continued)

(52) U.S. Cl.
    CPC ............ *B21C 37/08* (2013.01); *B23K 13/025* (2013.01); *C21D 8/10* (2013.01); *C21D 9/50* (2013.01);
    (Continued)

(58) Field of Classification Search
    CPC .. B21C 37/08; B23K 13/025; B23K 2201/06; C21D 8/10; C21D 9/50; C22C 38/02;
    (Continued)

(56) References Cited

U.S. PATENT DOCUMENTS 6,006,789 A * 12/1999 Toyooka ................. B21B 37/74
                                                                138/171
6,156,134 A * 12/2000 Shimizu ............... B23K 20/023
                                                                219/615
(Continued)

FOREIGN PATENT DOCUMENTS

| JP | 61-045688 B | 10/1986 |
| JP | 1-058264 B | 12/1989 |
| JP | 6-093339 A | 4/1994 |
| JP | 2004-11009 A | 1/2004 |
| JP | 2004-011009 A | 1/2004 |
| JP | 2005-076047 A | 3/2005 |

(Continued)

*Primary Examiner* — Hung D Nguyen
(74) *Attorney, Agent, or Firm* — DLP Piper LLP (US)

(57) ABSTRACT

A method for manufacturing an electric resistance welded steel tube including: forming a steel tube material into an almost cylindrical open pipe, the steel tube material being a steel sheet wherein Ti and N satisfy (N/14)<(Ti/47.9); forming an electric resistance welded steel tube by bonding ends of the open pipe to each other by induction resistance welding with heat input controlled so that the bond width is 30 to 65 μm; heating the electric resistance welded steel tube to a temperature equal to or higher than the $Ac_3$ transformation temperature; and diameter-reducing rolling the heated electric resistance welded steel tube with rolling reduction expressed by an outer diameter ratio greater than (1−25/the bond width before diameter-reducing rolling (μm))×100% such that the bond width is 25 μm or less.

4 Claims, 3 Drawing Sheets

(51) Int. Cl.
  *B21C 37/08* (2006.01)
  *B23K 13/02* (2006.01)
  *C21D 8/10* (2006.01)
  *C21D 9/50* (2006.01)
  *C22C 38/00* (2006.01)
  *C22C 38/02* (2006.01)
  *C22C 38/04* (2006.01)
  *C22C 38/06* (2006.01)
  *C22C 38/14* (2006.01)
  *B23K 101/06* (2006.01)

(52) U.S. Cl.
  CPC ............ *C22C 38/001* (2013.01); *C22C 38/02* (2013.01); *C22C 38/04* (2013.01); *C22C 38/06* (2013.01); *C22C 38/14* (2013.01); *B23K 2201/06* (2013.01); *Y10T 428/1241* (2015.01)

(58) Field of Classification Search
  CPC ......... C22C 38/04; C22C 38/06; C22C 38/14; C22C 38/001; Y10T 428/1241
  USPC ....... 219/607, 615, 617, 55, 56.22, 57, 59.1, 219/60.2, 76.17, 78.01, 610, 603; 148/645, 330, 603, 651, 320, 593, 337, 148/333
  See application file for complete search history.

(56) References Cited

U.S. PATENT DOCUMENTS

| | | | |
|---|---|---|---|
| 2003/0094217 A1* | 5/2003 | Yazawa | C21D 8/0405 148/325 |
| 2003/0131909 A1* | 7/2003 | Yoshinaga | C21D 8/10 148/320 |
| 2009/0250146 A1 | 10/2009 | Ishitsuka et al. | |

FOREIGN PATENT DOCUMENTS

| | | |
|---|---|---|
| JP | 2006-118021 A | 5/2006 |
| JP | 2006-206999 A | 8/2006 |

* cited by examiner

METHOD FOR ELECTRIC RESISTANCE WELDED STEEL TUBE

RELATED APPLICATIONS

This is divisional application of Ser. No. 12/528,551 filed Aug. 25, 2009, which is a §371 of International Application No. PCT/JP2008/051596, with an international filing date of Jan. 25, 2008 (WO 2008/105216 A1, published Sep. 4, 2008), which is based on Japanese Patent Application No. 2007-045749, filed Feb. 26, 2007, the subject matter of which is incorporated by reference.

TECHNICAL FIELD

This disclosure relates to an electric resistance welded steel tube suitably used for applications exposed to quenching treatment such as hollow stabilizers and, in particular, to improvement in hardenability of electric resistance welded portions.

BACKGROUND

Recently, the trend toward global environmental protection has resulted in emission gas standards for automobiles being tightened and weight saving of automobile bodies for improved mileage being promoted. In a recently demanded method for weight saving of automobile bodies, solid-core parts using bar steel are replaced with hollow ones using steel tubes. Stabilizers, which prevent automobile bodies from rolling when cornering thereby stabilizing high-speed driving, are no exception of this trend; solid-core products using bar steel are being changed to hollow ones using steel tubes (hollow stabilizers) for the purpose of weight saving of automobile bodies.

Such hollow stabilizers are usually produced in the following way: materials, namely, seamless steel tubes or electric resistance welded steel tubes, are cold-formed into a desired shape and then subjected to thermal refining including quenching or quenching and tempering. Among other materials, electric resistance welded steel tubes are relatively inexpensive and excellent in terms of accuracy of dimensions and thus are widely used as materials for hollow stabilizers. For example, Japanese Examined Patent Application Publication No. H1-58264 proposes a steel for electric resistance welded steel tubes for hollow stabilizers; this steel contains C: 0.35% or less, Si: 0.25% or less, Mn: 0.30 to 1.20%, Cr: less than 0.50%, N+O: 0.0200% or less, Ti: from four to twelve times the content of (N+O) contained in the steel, and B: 0.0005 to 0.009% and may further contain Ca: 200 ppm or less and/or Nb: at most 4/10 of the content ratio of C, wherein the content ratio of C, Si, Mn, and Cr is controlled so that $D_I$ will be 1.0 in. or more and that Ceq will be 0.60% or less.

Japanese Examined Patent Application Publication No. S61-45688 proposes a method for manufacturing a steel for electric resistance welded steel tubes for hollow stabilizers; in this method, a steel slab containing C: 0.35% or less, Si: 0.25% or less, Mn: 0.30 to 1.20%, Cr: less than 0.50%, N+O: 0.0200% or less, Ti: from four to twelve times the content of (N+O) contained in the steel, and B: 0.0005 to 0.009% and possibly further containing Ca: 200 ppm or less, wherein the content ratio of C, Si, Mn, and Cr is controlled so that $D_I$ will be 1.0 in. or more and that Ceq will be 0.60% or less, is hot-rolled and then coiled with the coiling temperature maintained in the range of 570 to 690° C.

Also, Japanese Unexamined Patent Application Publication No. H6-93339 proposes a method for manufacturing a strong and highly ductile electric resistance welded steel tube for stabilizers or the like. The technology described in Japanese Unexamined Patent Application Publication No. H6-93339 is a method for manufacturing a strong and highly ductile electric resistance welded steel tube in which a material, steel containing C: 0.18 to 0.28%, Si: 0.10 to 0.50%, Mn: 0.60 to 1.80%, Ti: 0.020 to 0.050%, and B: 0.0005 to 0.0050%, possibly further containing at least one of Cr: 0.20 to 0.50%, Mo: 0.5% or less, and Nb: 0.015 to 0.050%, and possibly further containing Ca: 0.0050% or less, is processed into an electric resistance welded steel tube, and then the electric resistance welded steel tube is subjected to a normalizing treatment at a temperature in the range of 850 to 950° C. followed by quenching.

For the relatively low cost and excellent accuracy of dimension thereof, electric resistance welded steel tubes have been widely used as materials for hollow stabilizers. However, recent attempts to reduce more weight of hollow stabilizers have forced them to be exposed to greater stresses; as a result, the arts described in Japanese Examined Patent Application Publication Nos. H1-58264 and S61-45688 and Japanese Unexamined Patent Application Publication No. H6-93339 fail to ensure sufficient durability, in particular, the durability of electric resistance welded portions, by themselves. This situation is attributable to insufficient hardenability of the electric resistance welded portions. More specifically, the hardness after quenching of electric resistance welded portions drops when electric resistance welded steel tubes are cold-bent into a desired shape and then quenched by rapid electric heating for a short time, sometimes leading to the decreased durability of a resultant material.

It could therefore be helpful to provide an electric resistance welded steel tube that is excellent in terms of flatness, has a sustained hardness after quenching of electric resistance welded portions even after being subjected to rapid quenching which is used for hollow stabilizers or the like, and thus can be used as a material that is excellent in terms of durability as well as a method for manufacturing such an electric resistance welded steel tube.

SUMMARY

We conducted extensive studies on why electric resistance welded steel tubes quenched by rapid heating using electric heating or the like have a decreased hardness after quenching of electric resistance welded portions and, as a result, found that such electric resistance welded portions of electric resistance welded steel tubes each have a layer containing less carbon (a low carbon layer) and that, when such low carbon layers have increased widths, rapid heating for a short time such as electric heating is insufficient that the electric resistance welded portions cannot revert to having a carbon content equal to or greater than a predetermined value, thereby resulting in a decreased hardenability of the electric resistance welded portions and an insufficient hardness after quenching. FIG. 1 shows a relationship between the width of a low carbon layer formed on an electric resistance welded portion and the hardness of the electric resistance welded portion reached after quenching and tempering. Note that the tested steel tube contained carbon at a content ratio of 0.24 mass % and that the width of a low carbon layer is a measured bond width.

We then studied the relationship between durability and the ratio of the hardness of electric resistance welded portions reached after quenching and tempering to that of the base metal. Durability was determined as a fatigue endurance measured in a two-sided torsion fatigue test according to the general rules specified in JIS Z 2273 with the repetition number of cycles being $10^6$. FIG. 2 shows the result, in which no significant decreases in fatigue endurance are noted when the hardness of electric resistance welded portions is 86% or more of that of the base metal. This result and FIG. 1 indicate that the width of a low carbon layer should be 25 µm or less such that the hardness of an electric resistance welded portion reached after quenching and tempering can be equal to or greater than the threshold of decrease in durability, namely, equal to or greater than 86% (360 HV) of the hardness of the base metal (: 420 HV).

We believe that such low carbon layers are inevitable in electric resistance welding and are formed as follows:
(1) During electric resistance welding, joints (electric resistance welded portions) are heated to the solid-liquid phase coexisting zone, so that C is concentrated in the liquid phase, leading to decrease in the amount thereof in the solid phase; and
(2) the liquid phase that is rich in C is ejected out of the electric resistance welded portions by the upset due to welding and forms beads; as a result, the electric resistance welded portions retain only the solid phase that is poor in C which forms a low carbon layer.

A possible way to achieve a width of low carbon layers of 25 µm or less is to reduce the heat input used during electric resistance welding. However, too small a heat input in electric resistance welding would often cause welding defects such as cold welds. This means that it is very difficult to prevent welding defects from occurring while maintaining the width of low carbon layers below the predetermined value by simply controlling the heat input in electric resistance welding. FIG. 3 shows a relationship between the width of a low carbon layer and the frequency of welding defects measured. Note that the width of a low carbon layer is a measured bond width and that the frequency of welding defects was determined by flatness measurement according to 8.4 of JIS G 3445, in which a test specimen (a steel tube) was positioned so that the electric resistance welded portion thereof was perpendicular to the direction of compression.

We then discovered that less welding defects in electric resistance welded portions and a high and consistent productivity of electric resistance welded steel tubes can be effectively guaranteed by reducing the width of a low carbon layer formed after welding by lowering the heat input in electric resistance welding as much as no welding defects such as cold welds can be formed so that the resultant solid-liquid phase coexisting zone will be narrow and then further reducing the width of a lower carbon layer to 25 µm or lower by mechanical means, namely, diameter-reducing rolling with a predetermined rolling reduction exceeded.

The "predetermined rolling reduction" mentioned above is an external diameter ratio expressed as (1−25/the width of a low carbon layer before diameter-reducing rolling (µm))× 100%. "The width of a low carbon layer" may be "the bond width." The bond width of electric resistance welded portions is mechanically reduced by diameter-reducing rolling. This can been seen in FIG. 4 showing a relationship between the ratio of the bond width before diameter-reducing rolling to that reached after diameter-reducing rolling, (the bond width before diameter-reducing rolling)/(the bond width reached after diameter-reducing rolling), and the diameter-reducing rolling reduction. Note that the horizontal axis of FIG. 4 represents (1−(diameter-reducing rolling reduction)/100). Diameter-reducing rolling reduces the bond width by a factor of (1−(diameter-reducing rolling reduction)/100).

In addition, the width of "a low carbon layer" mentioned above can be determined most accurately by EPMA-based C analysis of a zone (a layer) containing less C than the base metal; however, the width of a white layer corroded using nital or that of a zone (a layer) producing no segregation lines after metal flow etching is equivalent to the width determined by EPMA. In particular, the width of the zone (layer) producing no segregation lines after metal flow etching, which is also known as the bond width, can be accurately measured by a relatively simple method. Furthermore, the bond width shows little change even after electric resistance welded portions revert to having an initial carbon content by quenching and thus can be effectively used to pick our tubes from quenched steel tubes. Thus, the width of a low carbon layer formed on an electric resistance welded portion is represented by the bond width of the electric resistance welded portion.

We thus provide:
(1) An electric resistance welded steel tube for heat treatment that is excellent in terms of flatness, having an electric resistance welded portion whose bond width is 25 µm or less;
(2) An electric resistance welded steel tube for heat treatment that is excellent in terms of flatness, having an electric resistance welded portion whose bond width is 25 µm or less and having a composition constituted by, in mass percent, C: 0.15 to 0.40%, Si: 0.05 to 0.50%, Mn: 0.30 to 2.00%, Al: 0.01 to 0.10%, Ti: 0.001 to 0.04%, B: 0.0005 to 0.0050%, and N: 0.0010 to 0.0100% as well as Fe and unavoidable impurities as the balance, wherein Ti and N satisfy (N/14)<(Ti/47.9);
(3) The electric resistance welded steel tube for heat treatment according to (2), wherein the composition further contains one or more selected from, in mass percent, Cr: 1.0% or less, Mo: 1.0% or less, W: 1.0% or less, Ni: 1.0% or less, and Cu: 1.0% or less;
(4) The electric resistance welded steel tube for heat treatment according to (2) or (3), wherein the composition further contains either or both of, in mass percent, Nb: 0.2% or less and V: 0.2% or less;
(5) A method for manufacturing an electric resistance welded steel tube for heat treatment, including a step of forming a steel tube material into an almost cylindrical open pipe, the steel tube material being a steel sheet having a composition constituted by, in mass percent, C: 0.15 to 0.40%, Si: 0.05 to 0.50%, Mn: 0.30 to 2.00%, Al: 0.01 to 0.10%, Ti: 0.001 to 0.04%, B: 0.0005 to 0.0050%, and N: 0.0010 to 0.0100% with Ti and N satisfying (N/14)<(Ti/47.9) as well as Fe and unavoidable impurities as the balance; a step of making an electric resistance welded steel tube in which the ends of the open pipe are bonded to each other by induction resistance welding with heat input controlled so that the bond width will fall within the range of 30 to 65 µm; a step of heating the electric resistance welded steel tube to a temperature equal to or higher than the $Ac_3$ transformation temperature; and a step of diameter-reducing rolling the heated electric resistance welded steel tube with the rolling reduction expressed by an outer diameter ratio being greater than (1−25/the bond width before diameter-reducing rolling (µm))×100% such that the bond width will be 25 µm or less;
(6) The method for manufacturing an electric resistance welded steel tube for heat treatment according to (5), wherein the composition further contains one or more selected from, in mass percent, Cr: 1.0% or less, Mo: 1.0% or less, W: 1.0% or less, Ni: 1.0% or less, and Cu: 1.0% or less; and (7) The method for manufacturing an electric resistance welded steel tube according to (5) or (6), wherein the composition further contains either or both of, in mass percent, Nb: 0.2% or less and V: 0.2% or less.

We allow for easy and high-yield manufacturing of electric resistance welded steel tubes for heat treatment that have an electric resistance welded portion whose low carbon layer has a reduced width and are excellent in terms of flatness while avoiding the formation of welded defects; thus, we offer great advantages to industry. Furthermore, electric resistance welded steel tubes have an electric resistance welded portion whose low carbon layer has a reduced width, and thus the electric resistance welded portion thereof has a sustained hardness after quenching even after being quenched by rapid heating for a short time; as a result, highly durable quenched parts for hollow stabilizers or the like can be manufactured easily.

DETAILED DESCRIPTION

Figure 1:
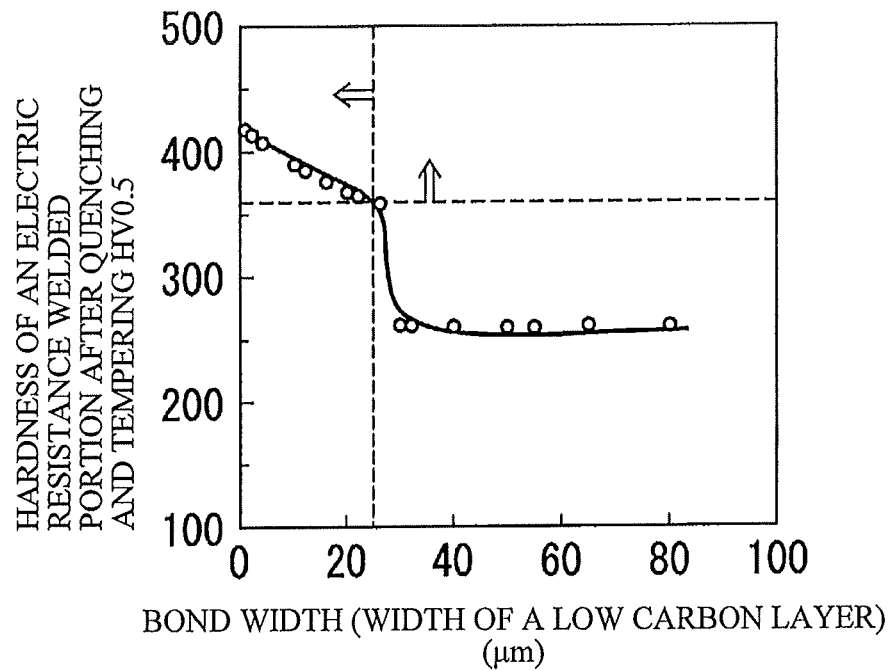
FIG. 1 is a graph showing a relationship between the hardness of an electric resistance welded portion reached after quenching and tempering and the bond width of the electric resistance welded portion.
Figure 2:
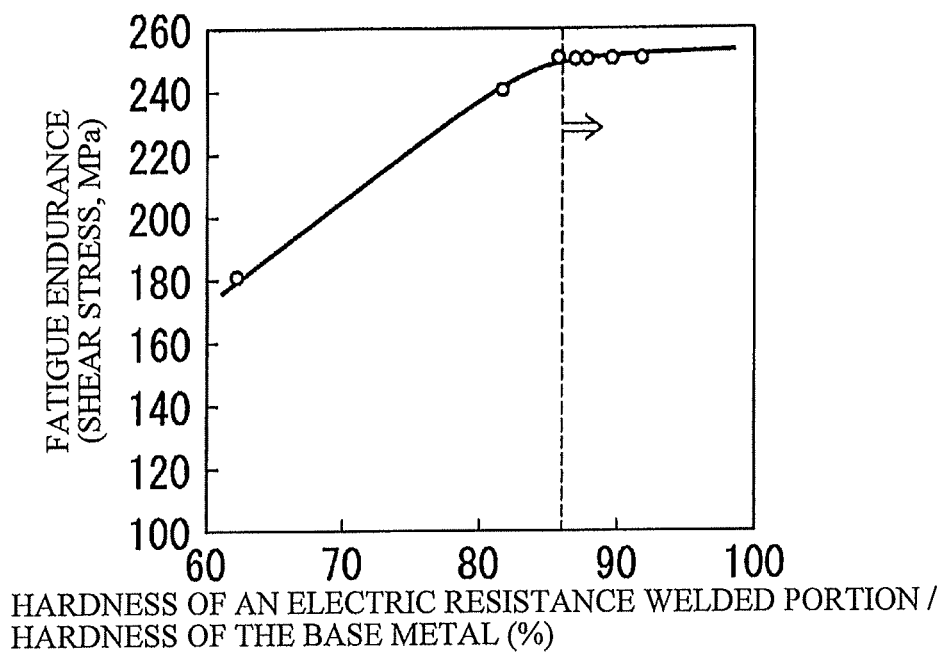
FIG. 2 is a graph showing a relationship between fatigue endurance and the ratio of the hardness of an electric resistance welded portion to that of the base metal.

An electric resistance welded steel tube is an electric resistance welded steel tube having an electric resistance welded portion whose bond width is 25 µm or less. When the bond width of the electric resistance welded portion is increased above 25 µm, the width of a low carbon layer is accordingly increased; as a result, the hardness after quenching of the electric resistance welded portion becomes much lower than that of the base metal as shown in FIG. 1 after the electric resistance welded steel tube is quenched by rapid heating using electric heating or the like, leading to a decreased durability of resultant quenched parts for hollow stabilizers or the like. Note that the bond width mentioned above is the width of a zone (a layer) located on the plane perpendicular to the tube axis direction and producing no segregation lines after metal flow etching.

Also, the electric resistance welded steel tube is excellent in terms of flatness. The expression "excellent in terms of flatness" used above means that, for example, flatness measurement according to the general rules specified in 8.4 of JIS G 3445 (flatness measurement), in which a test specimen is compressed until the distance between two flat plates reaches double the thickness of the test specimen, results in no cracks of electric resistance welded portions. In this flatness measurement, a test specimen (a steel tube) is positioned so that the electric resistance welded portion thereof is perpendicular to the direction of compression.

Incidentally, the following describes the reasons for the specified composition of the electric resistance welded steel tube.

C: 0.15 to 0.40%

C is a useful element, which increases the strength of steel when mixed into the steel and, after the steel is tempered, precipitates as carbides or carbonitrides increasing the strength of the steel. Our tubes should contain C at a content ratio of 0.15% or more such that a resultant steel tube can have a desired strength and that resultant quenched parts for hollow stabilizers can also have a desired strength. However, C contained at a content ratio higher than 0.40% would result in a reduced toughness after quenching. Therefore, the content ratio of C is limited to the range of 0.15 to 0.40%. Preferably, the content ratio of C is in the range of 0.20 to 0.35%.

Si: 0.05 to 0.50%

Si is an element that acts as a deoxidizing agent and should be contained at a content ratio of 0.05% or more to perform this action. However, when the content ratio of Si is higher than 0.50%, the deoxidizing action saturates without offering effects corresponding to the high content ratio, and thus a cost issue rises. Furthermore, such a high content ratio of Si would make inclusions more likely to occur during the electric resistance welding process, thereby affecting the soundness of an electric resistance welded portion. Therefore, the content ratio of Si is limited to the range of 0.05 to 0.50%. Preferably, the content ratio of Si is in the range of 0.10 to 0.30%.

Mn: 0.30 to 2.00%

Mn is an element that increases the strength of steel when mixed into the steel and improves the hardenability of the steel. Mn should be contained at a content ratio of 0.30% or more such that a desired strength will be ensured. However, Mn contained at a content ratio higher than 2.00% would result in the formation of residual austenite ($\gamma$), which reduces toughness after quenching. Therefore, the content ratio of Mn is limited to the range of 0.30 to 2.00%. Preferably, the content ratio of Mn is in the range of 0.30 to 1.60%.

Al: 0.01 to 0.10%.

Al is an element that not only acts as a deoxidizing agent but also has an effect of ensuring the effective amount of solid-solution B in improving hardenability via the fixation of N. Al should be contained at a content ratio of 0.01% or more to obtain this effect. However, Al contained at a content ratio higher than 0.10% would result in the formation of more inclusions, thereby shortening fatigue life in some cases. Therefore, the content ratio of Al is limited to the range of 0.01 to 0.10%. Preferably, the content ratio of Al is in the range of 0.02 to 0.05%.

B: 0.0005 to 0.0050%

B is an effective element that improves the hardenability of steel. Furthermore, B has the action of reinforcing grain boundaries and an effect of preventing cracks from occurring. B should be contained at a content ratio of 0.0005% or more to obtain these effects. However, when the content ratio of B is higher than 0.0050%, the effects described above saturate, and thus a cost issue rises. Furthermore, a content ratio of B higher than 0.0050% would result in the formation of coarse B-containing deposits, which reduces toughness in some cases. Therefore, the content ratio of B is limited to the range of 0.0005 to 0.0050%. Preferably, the content ratio of B is in the range of 0.0010 to 0.0025%.

Ti: 0.001 to 0.040%

Ti acts as a N-fixing element and has an effect of ensuring the effective amount of solid-solution B to improve hardenability. Furthermore, Ti precipitates as fine carbide particles, which prevent crystal grains from coarsening during welding and heat treatment, thereby contributing to improvement in toughness. Ti should be contained at a content ratio of 0.001% or more to obtain these effects. However, Ti contained at a content ratio higher than 0.040% would make inclusions much more likely to occur, thereby resulting in a reduced toughness. Therefore, the content ratio of Ti is limited to the range of 0.001 to 0.040%. Preferably, the content ratio of Ti is in the range of 0.020 to 0.030%.

N: 0.0010 to 0.0100%

N is an element that binds to alloy elements existing in steel to form nitrides and carbonitrides, thereby contributing to maintenance of strength during quenching. N should be contained at a content ratio of 0.0010% or more to obtain this effect. However, N contained at a content ratio higher than 0.0100% would allow nitrides to coarsen, thereby resulting in a reduced toughness and a shortened fatigue life. Therefore, the content ratio of N is limited to the range of 0.0010 to 0.0100%.

The content ratios of Ti and N, falling within the ranges described above, satisfy the following equation:

$$(N/14) < (Ti/47.9).$$

The content ratios of Ti and N not satisfying the equation shown above would destabilize the amount of solid-solution B during quenching and thus are unfavorable.

The components described above are basic components; however, besides these basic components, one or more selected from Cr: 1.0% or less, Mo: 1.0% or less, W: 1.0% or less, Ni: 1.0% or less, and Cu: 1.0% or less and/or either or both of Nb: 0.2% or less and V: 0.2% or less may be contained as needed.

One or more selected from Cr; 1.0% or less, Mo: 1.0% or less, W: 1.0% or less, Ni: 1.0% or less, and Cu: 1.0% or less Cr, Mo, W, Cu, and Ni are all elements having the action of improving the hardenability of steel; one or more of them may be contained as needed.

Cr not only improves hardenability but also has the action of increasing strength via the formation of fine carbides thereof, through which Cr contributes to maintenance of a desired strength. Cr is contained desirably at a content ratio of 0.05% or more to obtain these effects; however, when the content ratio of Cr is higher than 1.0%, the effects described above saturate, and thus a cost issue rises. Furthermore, such a high content ratio of Cr would make inclusions more likely to occur during the electric resistance welding process, thereby affecting the soundness of an electric resistance welded portion. Therefore, the content ratio of Cr is preferably limited to 1.0% or less. More preferably, the content ratio of Cr is in the range of 0.10 to 0.30%.

Mo not only improves hardenability but also has the action of increasing strength via the formation of fine carbides thereof, through which Mo contributes to maintenance of a desired strength. Mo is contained desirably at a content ratio of 0.05% or more to obtain these effects; however, when the content ratio of Mo is higher than 1.0%, the effects described above saturate, and thus a cost issue rises. Furthermore, such a high content ratio of Mo would lead to the formation of coarse carbide particles, thereby resulting in a reduced toughness in some cases. Therefore, the content ratio of Mo is preferably limited to 1.0% or less. More preferably, the content ratio of Mo is in the range of 0.10 to 0.30%.

W is an element that not only improves hardenability but also has the action of balancing hardness and toughness during thermal refining. W is contained desirably at a content ratio of 0.05% or more to obtain these effects. However, when the content ratio of W is higher than 1.0%, the effects saturate, and thus a cost issue rises. Therefore, the content ratio of W is preferably limited to 1.0% or less. More preferably, the content ratio of W is in the range of 0.10 to 0.30%.

Ni is an element that not only improves hardenability but also contributes to improvement in toughness and is contained desirably at a content ratio of 0.05% or more to obtain these effects; however, when the content ratio of Ni is higher than 1.0%, the effects described above saturate, and thus a cost issue rises. Furthermore, such a high content ratio of Ni would result in a reduced workability. Therefore, the content ratio of Ni is preferably limited to 1.0% or less. More preferably, the content ratio of Ni is in the range of 0.10 to 0.50%.

Cu is an element that not only improves hardenability but also increases resistance for hydrogen embrittlement and is contained desirably at a content ratio of 0.05% or more to obtain these effects; however, when the content ratio of Cu is higher than 1.0%, the effects described above saturate, and thus a cost issue rises. Furthermore, such a high content ratio of Cu would result in a reduced workability. Therefore, the content ratio of Cu is preferably limited to 1.0% or less. More preferably, the content ratio of Cu is in the range of 0.10 to 0.30%. Either or both of Nb: 0.2% or less and V: 0.2% or less Nb and V are elements that contribute to an increase in strength via the formation of carbides thereof and may be contained as needed. Nb and V are contained desirably at a content ratio of 0.01% or more and 0.01% or more, respectively, to obtain this effect; however, when Nb or V is contained at a content ratio higher than 0.2%, the effect saturates, and thus a cost issue rises. Therefore, the content ratio of Nb and V is preferably limited to 0.2% or less and 0.2% or less, respectively.

The balance, namely, the content other than the components described above, is constituted by Fe and unavoidable impurities. Acceptable unavoidable impurities are P: 0.020% or less, S: 0.010% or less, and O: 0.005% or less.

P is an element that affects weld cracking resistance and toughness, and the content ratio thereof is preferably controlled to be 0.020% or less in manufacturing of hollow stabilizers. More preferably, the content ratio of P is 0.015% or less.

S, existing as sulfide inclusions in steel, is an element that reduces the workability, toughness, and fatigue life of steel tubes while increasing the reheat crack sensitivity of the steel tubes, and the content ratio thereof is preferably controlled to be 0.010% or less in manufacturing of hollow stabilizers. More preferably, the content ratio of S is 0.005% or less.

O, existing mainly as oxide inclusions in steel, reduces the workability, toughness, and fatigue life of steel tubes, and thus the content ratio thereof is preferably controlled to be 0.005% or less in manufacturing of hollow stabilizers. More preferably, the content ratio of O is 0.002% or less.

Incidentally, the following describes a preferred method for manufacturing of the electric resistance welded steel tube.

A steel sheet having the composition described above is used as a steel tube material. There need be no particular limitations on the method for producing the steel sheet; it may be any known production method. The term "steel sheet" includes steel strips. There need be no particular limitations also on the kind of steel sheet, such as a hot-rolled steel sheet or a cold-rolled steel sheet; however, a hot-rolled steel sheet is preferable also in terms of material cost. In addition, most steel sheets for hollow stabilizers have a thickness of 2 mm or more, and thus the use of a cold-rolled steel sheet is impractical considering cost efficiency.

A steel tube material, namely, a steel sheet, is formed into an almost cylindrical open pipe preferably by continuous forming, and then the ends of the open pipe are bonded to each other by electric resistance welding based on induction resistance welding; as a result, an electric resistance welded steel tube is formed. The heat input used during this electric resistance welding process is controlled so that the bond width falls within the range of 30 to 65 It is preferable that the control of the heat input is achieved by adjusting voltage and current used in induction resistance welding, welding speed, the amount of upset, and so forth and that repeated measurement of the bond width under various electric resistance welding conditions has determined the induction resistance welding conditions that provide a desired bond width.

Figure 3:
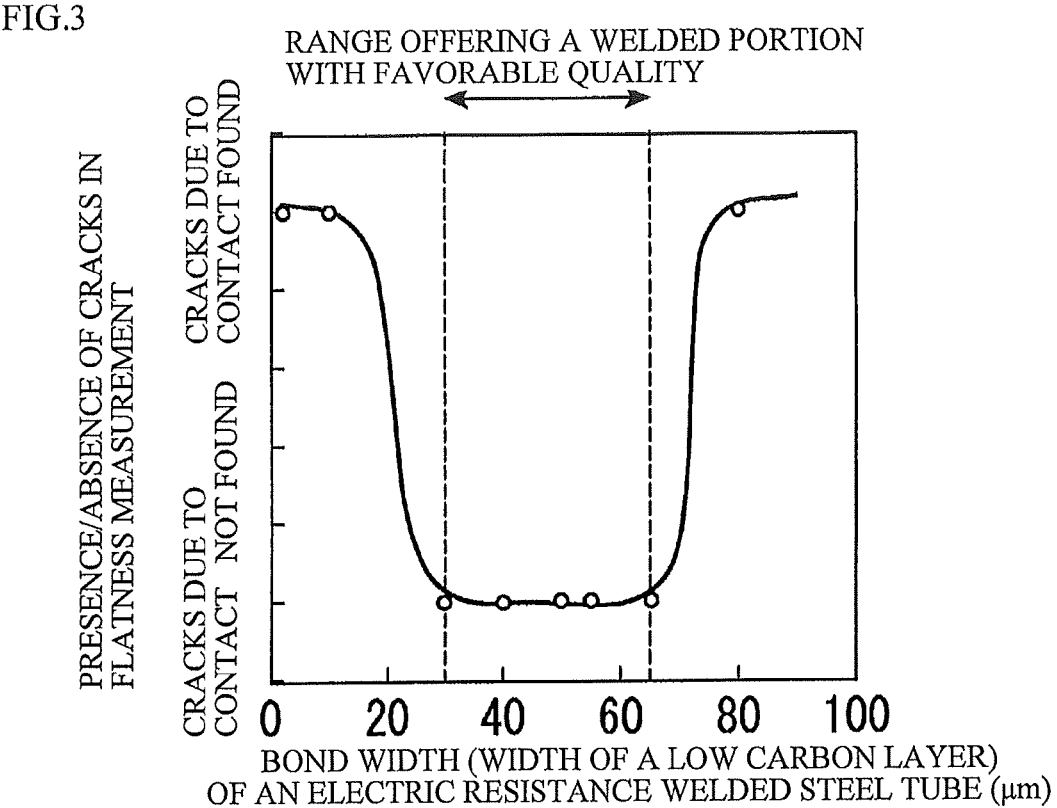
FIG. 3 is a graph showing a relationship between the frequency of welding defects and the bond width of an electric resistance welded portion.
Figure 4:
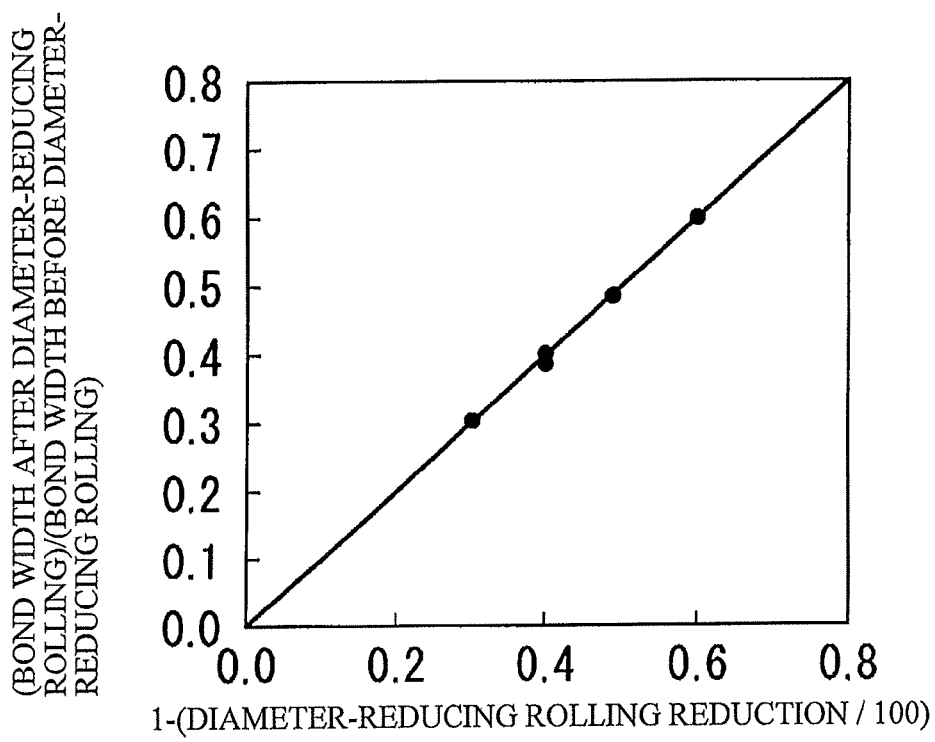
FIG. 4 is a graph showing a relationship between the ratio of the bond width before diameter-reducing rolling to that reached after diameter-reducing rolling and the diameter-reducing rolling reduction.

As shown also in FIG. 3, a bond width smaller than 30 μm means that the heat input is too small, which causes many welding defects and decreases in flatness. However, when the heat input is increased to the extent that the bond width is greater than 65 μm, oxidization during welding is promoted and oxides become more likely to remain, thereby causing welding defects to occur frequently; furthermore, diameter-reducing rolling with a greater rolling reduction is needed to reduce the width of a low carbon layer to one causing no decreases in hardness after quenching of an electric resistance welded portion, but a relatively great diameter limits the applications thereof. Therefore, the bond width reached after electric resistance welding is limited to the range of 30 to 65 μm. More preferably, the bond width is in the range of 35 to 45 μm.

Then, the entire body of the electric resistance welded steel tube with the adjusted bond width is heated to a temperature equal to or higher than the $Ac_3$ transformation temperature and then subjected to diameter-reducing rolling such that the bond width (the low carbon layer) of the electric resistance portion is mechanically reduced. Immediately after electric resistance welding, the electric resistance welded portion has a greater hardness than the base metal because of welding heat applied during the electric resistance welding process; thus, the electric resistance welded portion heated to a temperature lower than the $Ac_3$ transformation temperature cannot be effectively deformed during the subsequent diameter-reducing process, in other words, the bond width (the low carbon layer) of the electric resistance portion cannot be effectively reduced. The heating temperature is preferably 1000° C. or lower considering surface decarburization. In addition, localized heating of an electric resistance welded portion would cause the electric resistance welded portion to swell during diameter-reducing rolling and, accordingly, the resultant steel tube to have an unfavorable shape. Therefore, the electric resistance welded steel tube is heated as a whole to a temperature equal to or higher than the $Ac_3$ transformation temperature.

The rolling reduction for diameter-reducing rolling expressed by an outer diameter ratio is greater than (1−25/ the bond width before diameter-reducing rolling (μm))× 100%. When the rolling reduction is lower than the value described above, the desired bond width (width of a low carbon layer), namely, 25 μm or less, cannot be obtained. The higher the rolling reduction for diameter-reducing rolling is, the narrower the resultant bond width (width of a low carbon layer) is. There need be no particular limitation on the upper limit; however, considering the number of stands a diameter-reducing roller has, the upper limit is usually approximately 75%.

EXAMPLES

Hot-rolled steel sheets having compositions shown in Table 1 were used as steel tube materials. These steel tube materials were cold-formed into almost cylindrical open pipes, and then the ends of each of the open pipes were bonded to each other by electric resistance welding based on induction resistance welding; as a result, electric resistance welded steel tubes (mother tubes) were formed. Repeated measurement of the bond width under various electric resistance welding conditions (width variously adjusted heat input) had determined standard conditions. With reference to the standard conditions, the welding conditions were variously changed as shown in Table 2, and the bond width of the mother tubes was controlled as shown in Table 2. Subsequently, these electric resistance welded steel tubes (mother tubes) were heated in their entireties under the conditions shown in Table 2 and then subjected to diameter-reducing rolling with the rolling reductions shown in Table 2. In this way, product tubes were obtained.

Test specimens for structure observation each including an electric resistance welded portion were sampled from the obtained mother tubes and product tubes. The test specimens were observed for their structures and evaluated for the bond width of the electric resistance welded portion. Also, the obtained mother tubes and product tubes were tested for welding quality on the basis of the presence/absence of cracks determined by flatness measurement.

Test specimens for hardness measurement each including an electric resistance welded portion were also sampled from the obtained electric resistance welded steel tubes. The test specimens were quenched by rapid heating under the conditions shown in FIGS. 5 and 6, and then tempered under the conditions shown in Table 3. Subsequently, the test specimens were evaluated in hardness measurement for the hardness after quenching and the hardness after quenching and tempering of the electric resistance welded portion. Also, test materials for fatigue test (length in the tube axis direction: 250 mm) were sampled from the obtained product tubes. After being subjected to quenching treatment by rapid heating shown in FIG. 5 or FIG. 6 followed by tempering treatment shown in Table 2, the test materials for fatigue test proceeded with torsion fatigue test. The test methods were as follows:

(1) Structure Observation

From each of the mother tubes and product tubes, a cross section that includes an electric resistance welded portion and is perpendicular to the tube axis direction was cut out. After being polished and corroded with a metal flow etching (5% picric acid+a surface acting agent) solution, the cross sections proceeded with observation of the structure thereof under a light microscope (magnification ratio: 400). Then, the maximum width of a zone (a layer) in the cross-sectional structure producing no segregation lines was measured; the obtained widths were used as widths of bond.

(2) Flatness Measurement

Seven test specimens for flatness measurement (length: 150 mm) were sampled from each of the mother tubes and product tubes. After being subjected to a normalization treatment at 900° C.×10 min, the test specimens were tested for cracks in the electric resistance welded portion thereof in flatness measurement according to the general rules specified in 8.4 of JIS G 3445. Note that, in flatness measurement, each of the test specimens was compressed until the distance between two flat plates reaches double the thickness of the test specimen. Also, each of the test specimens was positioned so that the electric resistance welded portion thereof was perpendicular to the direction of compression.

(3) Hardness Measurement

From the mother tubes and product tubes, test specimens for electric resistance welded portion hardness measurement (size: the thickness of the pipe×10 mm in length) and test specimens for base metal hardness measurement having the same size as the test specimens for electric resistance welded portion hardness measurement were sampled. The test specimens were subjected to quenching treatment by rapid heating shown in FIGS. 5 and 6, and then the Vickers hardness Hv0.5 of the electric resistance welded portions and the base metals was measured using a Vickers hardness meter (load: 5 N). The measurement began with outer surfaces and proceeded by a pitch of 0.15 mm. The obtained values were arithmetically averaged, and the obtained averages were used as the electric resistance welded portion hardness and the base metal hardness of the steel tubes.

(4) Fatigue Test

Test materials for fatigue test (length in the tube axis direction: 250 mm) were sampled from the product tubes. After being subjected to quenching treatment by rapid heating shown in FIGS. 5 and 6 followed by tempering treatment under the conditions shown in Table 2, the test materials for fatigue test proceeded with torsion fatigue test. In fatigue test, fatigue endurance was determined in a two-sided torsion fatigue test according to the general rules specified in JIS Z 2273 with the repetition number of cycles being $10^6$.

The obtained results are shown in Tables 2 and 3.

TABLE 1

| Steel No. | Chemical components (mass %) | | | | | | | | | | | | | | Relation between N and Ti satisfied? |
|---|---|---|---|---|---|---|---|---|---|---|---|---|---|---|---|
| | C | Si | Mn | P | S | Al | N | O | Ti | B | Cr | Ca | Nb | Cu | |
| A | 0.24 | 0.23 | 0.54 | 0.012 | 0.0020 | 0.018 | 0.0035 | 0.0010 | 0.016 | 0.0023 | 0.29 | 0.0001 | — | — | ○ |
| B | 0.19 | 0.39 | 1.58 | 0.011 | 0.0010 | 0.033 | 0.0032 | 0.0013 | 0.013 | 0.0012 | — | — | 0.015 | 0.15 | ○ |
| C | 0.35 | 0.28 | 1.32 | 0.010 | 0.0009 | 0.033 | 0.0037 | 0.0006 | 0.014 | 0.026 | — | 0.0002 | — | — | ○ |

*(N/14) < (Ti/47.9) is satisfied: ○; other cases: x

TABLE 2

| Steel tube No. | Steel No. | Electric resistance welding conditions | | Mother tube: size | | | Diameter-reducing rolling conditions | |
|---|---|---|---|---|---|---|---|---|
| | | ΔHeat input* | ΔWelding Speed* | Outer diameter (mm) | Thickness (mm) | Mother tube: bond width (μm) | Heating temperature (° C.) | Finishing temperature (° C.) |
| 1 | A | +2.4% | −30% | 88 | 2.6 | 80 | 980 | 780 |
| 2 | A | +1.6% | Standard | 88 | 2.6 | 65 | 980 | 780 |
| 3 | A | +0.8% | Standard | 88 | 2.6 | 55 | 980 | 780 |
| 4 | A | Standard | Standard | 88 | 2.6 | 50 | 980 | 780 |
| 5 | A | −0.8% | Standard | 88 | 2.6 | 40 | 980 | 780 |
| 6 | A | −1.6% | Standard | 88 | 2.6 | 30 | 980 | 780 |
| 7 | A | −3.2% | Standard | 88 | 2.6 | 10 | 980 | 780 |
| 8 | A | −4.0% | Standard | 88 | 2.6 | 2 | 980 | 780 |
| 9 | A | Standard | Standard | 88 | 2.6 | 50 | 980 | 780 |
| 10 | B | Standard | Standard | 88 | 6.5 | 42 | 980 | 780 |
| 11 | C | Standard | Standard | 88 | 5.5 | 37 | 980 | 780 |

| Steel tube No. | Diameter-reducing rolling conditions | | Product tube: size | | | Remarks |
|---|---|---|---|---|---|---|
| | Rolling reducttion (° C.) | Predetermined rolling reduction** (%) | Outer diameter (mm) | Thickness (mm) | Product tube: bond width (μm) | |
| 1 | 60 | 69 | 35.1 | 2.6 | 32 | Comparative Example |
| 2 | 62 | 62 | 33.4 | 2.6 | 25 | Example |
| 3 | 60 | 55 | 35.1 | 2.6 | 22 | Example |
| 4 | 60 | 50 | 35.1 | 2.6 | 20 | Example |
| 5 | 60 | 38 | 35.1 | 2.6 | 16 | Example |
| 6 | 60 | 17 | 35.1 | 2.6 | 12 | Example |
| 7 | 60 | 0 | 35.1 | 2.6 | 4 | Comparative Example |

TABLE 2-continued

| | | | | | | |
|---|---|---|---|---|---|---|
| 8 | 60 | 0 | 35.1 | 2.6 | 1 | Comparative Example |
| 9 | 40 | 50 | 50.8 | 2.6 | 30 | Comparative Example |
| 10 | 70 | 40 | 26.5 | 6.0 | 13 | Example |
| 11 | 51 | 32 | 42.7 | 5.0 | 18 | Example |

*ΔHeat input: A deviation (%) from the standard
ΔWelding speed: A deviation (%) from the standard
**1-25/(Bond width of a mother tube (μm))) × 100

TABLE 3

Figure 5:
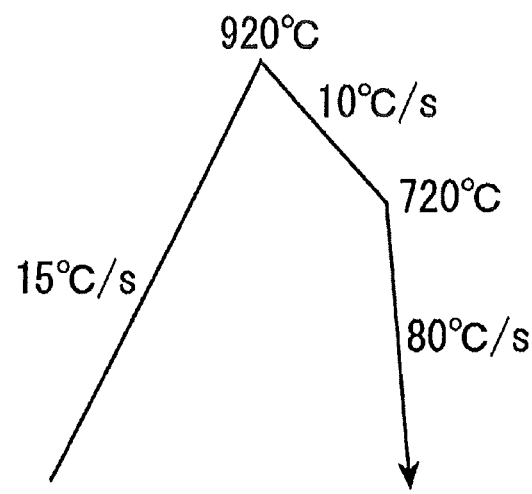
FIG. 5 is a schematic diagram of quenching treatment conditions used in an example.
Figure 6:
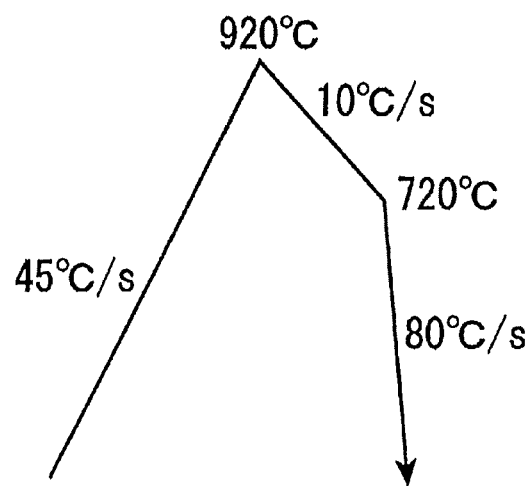
FIG. 6 is a schematic diagram of other quenching treatment conditions used in the example.

| | Cracks in flatness measurement | | Heat treatment conditions | | Mother tube: electric resistance welded portion | |
|---|---|---|---|---|---|---|
| Steel tube No. | Mother tube | Product Tube | Quenching conditions | Tempering temperature (° C.) | Hardness as quenching Hv0.5 | Hardness as quenching and tempering Hv0.5 |
| 1 | Found | Found | FIG. 5 | 350 | 260 | 260 |
| 2 | Not found | Not found | FIG. 5 | 350 | 261 | 261 |
| 3 | Not found | Not found | FIG. 5 | 350 | 260 | 260 |
| 4 | Not found | Not found | FIG. 5 | 350 | 260 | 260 |
| 5 | Not found | Not found | FIG. 5 | 350 | 260 | 260 |
| 6 | Not found | Not found | FIG. 5 | 350 | 262 | 262 |
| 7 | Found | Found | FIG. 5 | 350 | 447 | 390 |
| 8 | Found | Found | FIG. 5 | 350 | 499 | 414 |
| 9 | Not found | Not found | FIG. 6 | 350 | — | — |
| 10 | Not found | Not found | FIG. 5 | 350 | 260 | 260 |
| 11 | Not found | Not found | FIG. 5 | 400 | 384 | 317 |

| | Product tube: electric resistance welded portion | | | | |
|---|---|---|---|---|---|
| Steel tube No. | Hardness as quenching Hv0.5 | Hardness as quenching and tempering Hv0.5 | Hardness ratio (%) (electric resistance welded portion/ base metal) | Fatigue endurance** (MPa) | Remarks |
| 1 | 261 | 261 | 62 | 180 | Comparative Example |
| 2 | 380 | 360 | 86 | 250 | Example |
| 3 | 392 | 365 | 87 | 250 | Example |
| 4 | 399 | 369 | 88 | 250 | Example |
| 5 | 417 | 376 | 90 | 250 | Example |
| 6 | 437 | 385 | 92 | 250 | Example |
| 7 | 485 | 407 | 97 | 200 | Comparative Example |
| 8 | 508 | 418 | 99 | 200 | Comparative Example |
| 9 | 360 | 343 | 82 | 240 | Comparative Example |
| 10 | 408 | 372 | 93 | 250 | Example |
| 11 | 580 | 406 | 94 | 280 | Example |

**Fatigue endurance measured after $10^6$ cycles

Our examples all had no cracks after flatness measurement, were excellent in terms of flatness, and experienced no significant decrease in the hardness after quenching of the electric resistance welded portion or no decrease in fatigue endurance. However, the comparative examples, which had a bond width of the electric resistance welded portion outside our range, experienced a significant decrease in the hardness after quenching of the electric resistance welded portion and in fatigue endurance, had many welding defects, or experienced a further decrease in fatigue endurance.

What is claimed is:
1. A method for manufacturing an electric resistance welded steel tube for heat treatment, comprising:
forming a steel sheet into an almost cylindrical open pipe, the steel tube material being a steel sheet having a composition constituted by, in mass percent:

C: 0.15 to 0.40%  Si: 0.05 to 0.50%
Mn: 0.30 to 2.00%  Al: 0.01 to 0.10%
Ti: 0.001 to 0.04%  B: 0.0005 to 0.0050%, and
N: 0.0010 to 0.0100% with Ti and N satisfying (N/14)<(Ti/47.9) as well as Fe and unavoidable impurities as the balance;
forming an electric resistance welded steel tube by bonding lengthwise ends of the open pipe to each other by electric resistance welding with heat input controlled so that the bond width will fall within the range of 30 to 65 μm;

heating the electric resistance welded steel tube to a temperature equal to or higher than the $Ac_3$ transformation temperature; and diameter-reducing rolling the heated electric resistance welded steel tube with rolling reduction expressed by an outer diameter ratio being (1−25/the bond width before diameter-reducing rolling (μm))×100% or greater such that the bond width will be 25 μm or less.

2. The method according to claim 1, wherein the composition further comprises one or more selected from, in mass percent, Cr: 1.0% or less, Mo: 1.0% or less, W: 1.0% or less, Ni: 1.0% or less, and Cu: 1.0% or less.

3. The method according to claim 2, wherein the composition further contains either or both of, in mass percent, Nb: 0.2% or less and V: 0.2% or less.

4. The method according to claim 1, wherein the composition further contains either or both of, in mass percent, Nb: 0.2% or less and V: 0.2% or less.

\* \* \* \* \*